Aug. 12, 1969

L. A. KLEVEN 3,461,383

RESISTANCE MEASURING METHOD AND APPARATUS
HAVING MEANS FOR ALTERNATELY CONNECTING
UNKNOWN RESISTOR TO DIFFERENT
ARMS OF BRIDGE

Filed Aug. 25, 1966

INVENTOR.
LOWELL A. KLEVEN
BY
Robert R. Kaseman
AGENT

Aug. 12, 1969
L. A. KLEVEN
3,461,383
RESISTANCE MEASURING METHOD AND APPARATUS
HAVING MEANS FOR ALTERNATELY CONNECTING
UNKNOWN RESISTOR TO DIFFERENT
ARMS OF BRIDGE
Filed Aug. 25, 1966
4 Sheets-Sheet 2
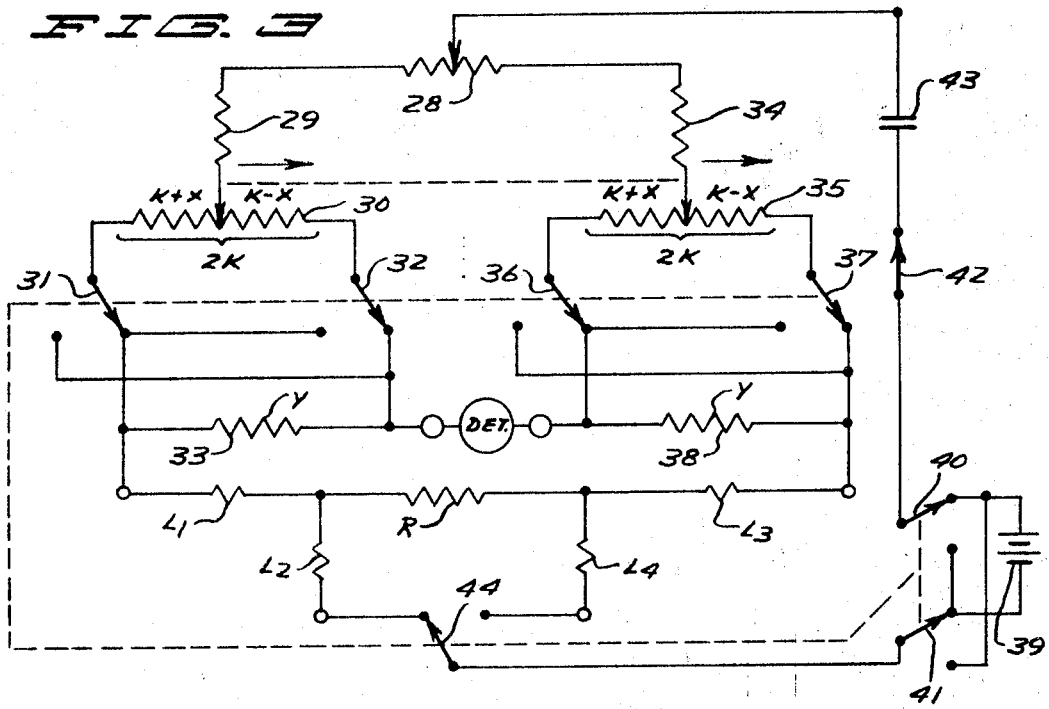
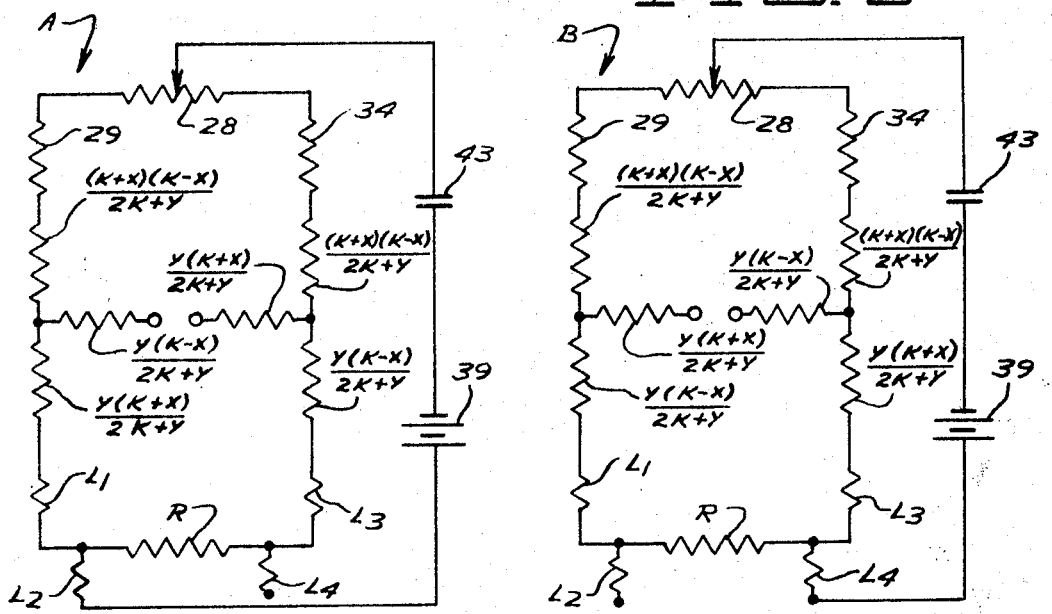
INVENTOR.
LOWELL A. KLEVEN
BY
Robert R. Kasiman
AGENT

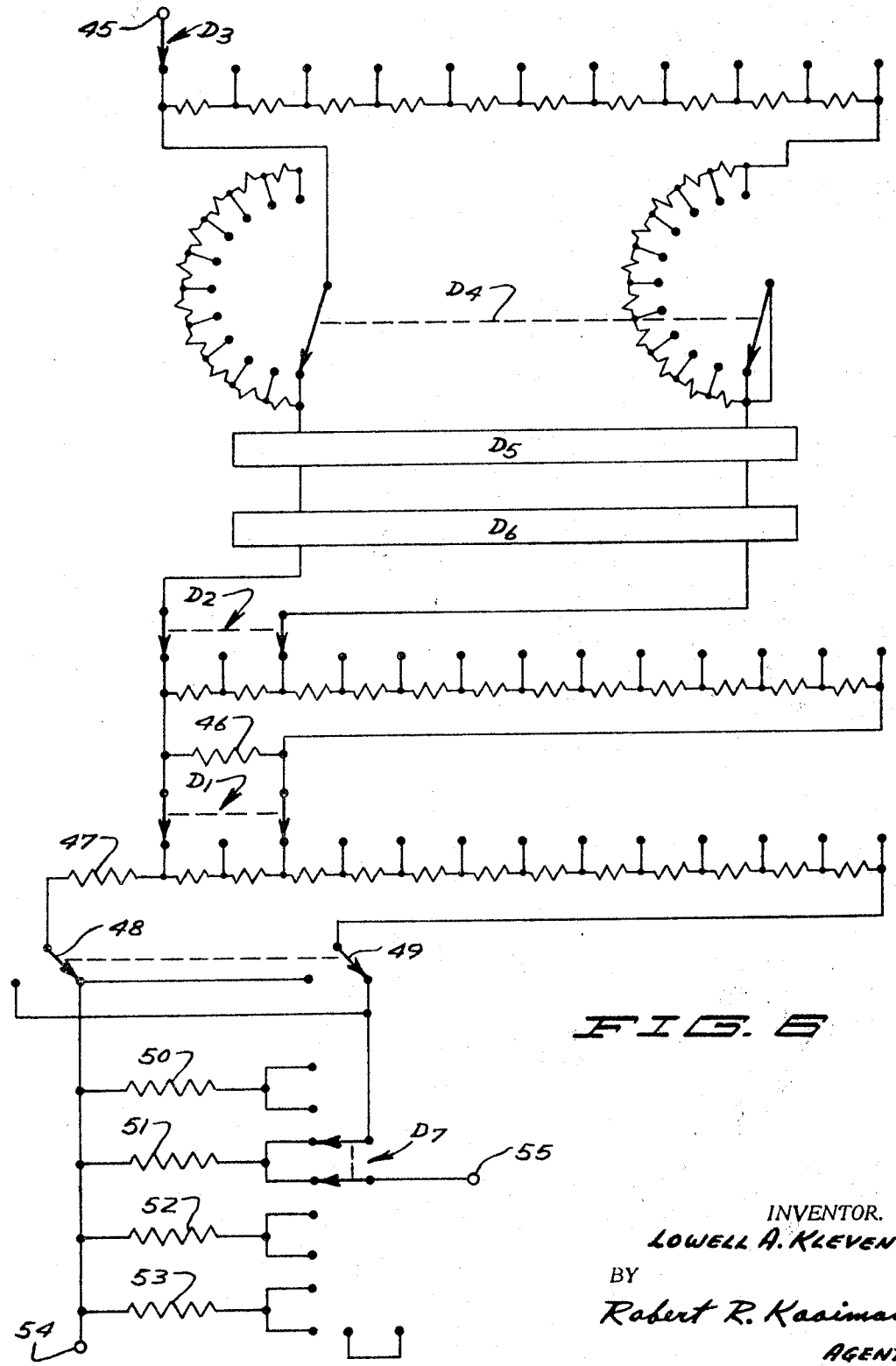

Aug. 12, 1969

L. A. KLEVEN 3,461,383

RESISTANCE MEASURING METHOD AND APPARATUS
HAVING MEANS FOR ALTERNATELY CONNECTING
UNKNOWN RESISTOR TO DIFFERENT
ARMS OF BRIDGE

Filed Aug. 25, 1966

INVENTOR.
LOWELL A. KLEVEN
BY
Robert R. Kosiman
AGENT

United States Patent Office 3,461,383
Patented Aug. 12, 1969

3,461,383
RESISTANCE MEASURING METHOD AND APPARATUS HAVING MEANS FOR ALTERNATELY CONNECTING UNKNOWN RESISTOR TO DIFFERENT ARMS OF BRIDGE
Lowell A. Kleven, Minneapolis, Minn., assignor to Rosemount Engineering Company, Minneapolis, Minn., a corporation of Minnesota
Filed Aug. 25, 1966, Ser. No. 575,011
Int. Cl. G01r 27/02
U.S. Cl. 324—62                                    18 Claims

ABSTRACT OF THE DISCLOSURE

A bridge circuit in which an unknown resistor is alternately connected to a first branch of a bridge and to an adjacent arm in a second branch of the bridge, and when the unknown resistor is in the arm of the first branch of the bridge a first known resistance is placed into the adjacent arm, and when the unknown resistor is in the adjacent arm a third known resistor is placed into the arm of the first branch while the second known resistance is removed from the adjacent arm. The second and third resistances are adjustable, and at bridge balance will equal the value of the unknown resistor.

This invention relates generally to electrical bridge circuits and in particular to precise resistance measuring bridges wherein one or more arms constitute an adjustable known resistance which is employed through a bridge balance condition to indicate resistance of an unknown resistor.

Although the invention described herein was conceived primarily as a laboratory standard type of instrument to satisfy the requirements of resistance measurement to an accuracy in the order of 1 p.p.m. for a wide range of resistance value, the inventive features also offer numerous advantages in the design of less sophisticated, lower accuracy bridges.

In brief the invention comprises switching means to alternately connect the unknown resistor in an arm in a first branch of a bridge and in an adjacent arm in a second branch and additional switching means operating in known phase relationship to connect a first known resistance into the first branch and a second known resistance into the second branch. The known resistances are preferably precisely equal and mechanically ganged and each preferably comprises a standard resistor in parallel with an adjustable current divider. Also in a preferred embodiment of high accuracy design additional switching means is employed to alternately switch polarity of a direct current bridge excitation in phase with the resistor switching and a capacitor is connected in series with the excitation which combination allows direct connection of a DC galvanometer to the bridge output terminals for indication of bridge balance and minimizes deleterious effects of variable and asymmetrical phasing between the various switching elements. In this embodiment, unbalance of fixed bridge arms and unmatched lead resistances appear only as an AC signal. In another embodiment a DC excitation and an AC null detector is used, and voltages due to unbalance of fixed bridge resistances and unmatched leads appear only as a DC voltage.

Several resistance measuring circurits have gained acceptance for use in high precision measurement of an unknown resistance. Notable among these is the Smith Bridge which employs resistance dividing networks in parallel with the lead wires of the unknown resistor. The dividers may be adjusted via an independent balance so that the primary balance made between the unknown resistor in one bridge arm and a known resistor in an adjacent arm is not dependent on lead wire resistances. However, this requires that lead wire resistances are constant while the two balances are effected. The Mueller Bridge is another well known circuit and several design variations of the Mueller Bridge covering a large range of accuracy and complexity have been widely accepted. Some of these designs employ switching means to interchange the known and unknown resistors in adjacent bridge arms while effecting a bridge balance for each condition. Errors due to lead wire resistances may be negligibly small with these designs so long as lead wire resistances are constant during the reading cycle. Accuracy limits are imposed by switch contact resistances and potentials which appear in sensitive portions of the circuit. Common to both the Smith Bridge and Mueller Bridge is the severe and costly requirement of constructing precision resistor combinations adjustable in increments of 1 p.p.m. or finer while maintaining negligibly small contact errors. A resistance measuring circuit of more recent origin which falls in the class of high precision instruments is the Dauphinee comparator method (U.S. Patent 2,798,198) which employs a condenser and switching means to alternately connect the condenser across a known resistor and an unknown resistor which are series connected with a DC current source. The known resistance is adjusted to give zero current flow from the condenser at which condition the known and unknown resistors are substantially equal. Switch capacitance and potentials impose accuracy limitations, although in practice these errors are reduced to small values. Readings are nearly independent of fixed values of lead resistance but changing values can introduce small errors. Another instrument of recent origin is the Rosemount Engineering Company comparison bridge (U.S. patent application No. 397,426) which employs a potentiometric measurement between the unknown and known resistors which are energized via precise tapped current transformers. Modulation techniques permit use of the transformers in a highly accurate mode while comparing the resistances at a much lower and more suitable frequency. Lead resistance errors and thermoelectric potential errors are negligibly small and the inherent precision of transformer current division is advantageous, however, the requirement for AC circuitry is somewhat restrictive.

Of the aforementioned designs the instant invention bears most resemblance to the Mueller Bridges, however, this invention comprises very important differences in construction and operation which overcome many of the shortcomings of the prior art as demonstrated by the following description.

It is, therefore, an object of this invention to provide resistance measurement circuitry for bridge designs encompassing a wide range of resistance measurement and accuracy tolerances.

A further object is to provide bridge circuitry means whereby an unknown resistor is alternately compared with known resistances by switching means while introducing negligibly small errors from the switching means.

A further object is to provide bridge circuitry suitable for use with conventional DC excitation and detection apparatus but which may be used also with AC apparatus.

A further object is to provide resistance measurement circuitry of the null balance class wherein the adjustable resistance comprises a pair of like networks which are ganged together.

A further object is to provide resistance measurement circuitry employing alternate switching wherein asymmetric switching cycles may be tolerated.

Other objects and advantages will be apparent from the detailed description and attached drawings.

In the drawings:

FIGURE 3 is a schematic showing basic features of a preferred embodiment of the invention.

FIGURES 4 and 5 are schematics showing the circuitry connections of the circuit of FIGURE 3 as they exist during alternate measurement periods.

FIGURE 6 is a detailed schematic of one of the known resistance networks used in a high accuracy embodiment of the invention.

Figure 1:
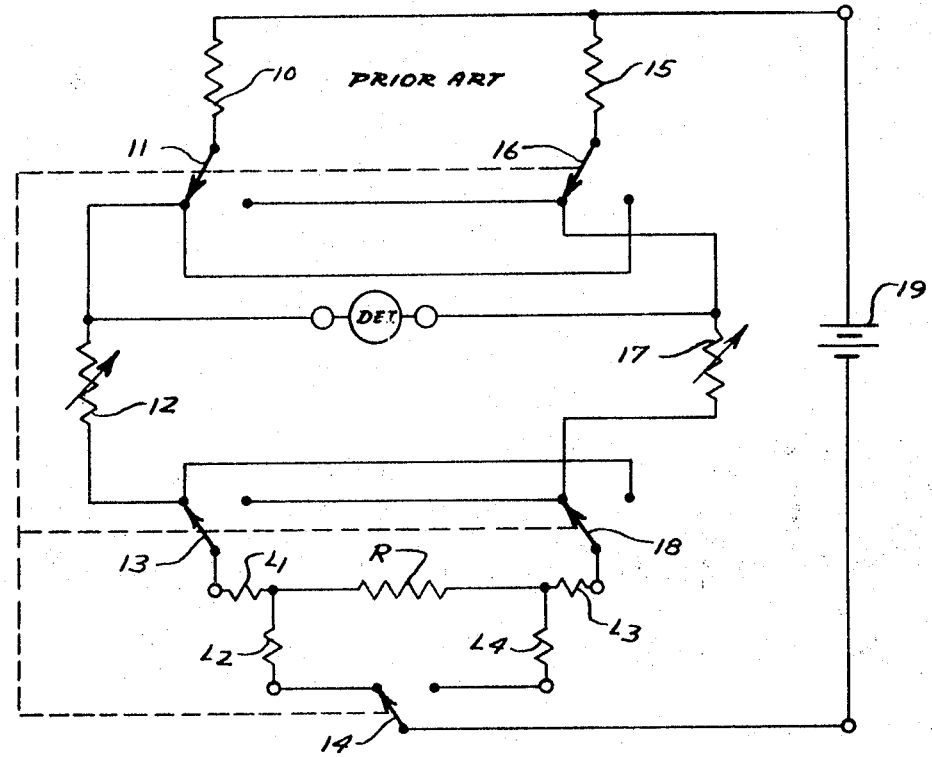
FIGURE 1 is a schematic showing basic operational features of the prior art Mueller Bridges.

FIGURE 1, labeled Prior Art, is a simplified representation of a widely accepted form of the Mueller Bridge for precise measurement of four-terminal resistors. This particular design employs five ganged switches each of which has two positions and a bridge balance condition is obtained for each position of the switches. At a first switch condition one bridge branch comprises resistor 10 connected through switch 11 to a detector terminal and to adjustable resistor 12. The other end of resistor 12 connects through switch 13 and hence through lead resistance $L_1$ of the unknown resistor R. The parallel bridge branch comprises resistor 15 connected through switch 16 to the other detector terminal and to one end of adjustable resistor 17. The other end of resistor 17 connects through switch 18, thence through lead resistance $L_3$ and thence through resistor R to complete the bridge. Lead resistor $L_2$ is in series with switch 14 and the DC bridge excitation 19. In the second switch condition one bridge branch comprises resistor 10 connected in series with resistor 17, lead $L_1$ and resistor R. The parallel branch comprises resistor 15 in series with resistor 12 and lead $L_3$. Lead resistor $L_4$ appears in series with the bridge at this switch condition. The effect of this switching is to interchange the adjustable resistors 12, 17, while switching the unknown resistor R from one branch to the other. Thus, if the detector reads the same at both switch positions, resistor 12 is equal to the sum of resistor 17 and the unknown resistor R. This equality holds provided that changes of switch (including the switches employed in the adjustable resistors) resistances are negligibly small and that the other bridge resistors including lead resistances $L_1$ and $L_3$ remain constant throughout the measuring sequence. Thermoelectric potentials do not introduce errors if they are stable since the normal procedure is to repeatably reverse the excitation at each switch position to effect the balance condition. These restrictions often become unduly limiting particularly in the field of platinum thermometry where precision requirements are exacting and lead resistances are subject to changes which may be large and rapid as compared to precision resistor comparisons under laboratory environments. Since many of the switch contacts of this design appear in series with the unknown resistor, these switches must be of extremely low resistance and stable contact potentials and such switches are not generally suited for rapid and continuous operation.

By comparison, the present invention provides circuitry which also relies on a switching of the unknown resistor from one bridge branch to the other but the restrictions of the prior art are removed by making use of two identical known resistors connected in a manner different from the adjustable resistors of FIGURE 1. The principles of operation may be clearly understood by reference to FIGURE 2 where three ganged switches, each having two contact positions are employed. At a first switch condition one bridge branch circuit comprises resistor 20 which connects through switch 21 to the unknown resistor lead $L_1$ and also to adjustable resistor 22 which is in series with the detector circuit. Unknown resistor R connected to lead $L_1$ completes this branch circuit. The parallel branch circuit comprises resistor 23 which connects through switch 24 to the detector circuit and also to one end of adjustable resistor 25. The opposite end of resistor 25 connects through lead $L_3$ to complete this branch circuit. Lead $L_4$ connects to resistor R and to lead $L_3$ at one end and the other end connects through switch 26 to excitation 27. In the other switch condition one bridge branch comprises resistors 20, 22 and lead $L_1$ all in series and the parallel branch comprises resistor 23, lead $L_3$ and resistor R in series. Lead $L_2$ appears in series with the excitation under this condition and resistor 25 appears in series with the detector circuit. Adjustable resistors 22 and 25 are ganged together and are identical. Then if the bridge balance is unchanged at the two switch conditions resistor R must be substantially the same value as resistor 22 and resistor 25. There are no switches in the sensitive bridge portions comparable to switches 13 and 18 of FIGURE 1 so these error sources have been eliminated in the circuitry of FIGURE 2 and although the bridge may be manually operated it is practical (and desirable) to automatically cycle the remaining switches for sustained periods without introducing intolerable errors. Resistors 20 and 23 are of relatively large value, for example, 10,000 ohms and switches 21, 24 and 26 may be of coin silver but preferably are of the mercury wetted type for long life. Both types of switches have been tested in this general bridge configuration and have shown contact resistances stable to better than .5 milliohm. This contact resistance for switches 21 and 24 appear in series with 10,000 ohms and consequently represents an uncertainty of only .05 p.p.m. per switch. Switch 26 is in an even less critical position since it is in series with the bridge and with excitation 27. Excitation 27 may be a current source of high impedance to further reduce effects of switch 26. Contact potential variation of such switches are typically less than 2 microvolts and even with branch currents as low as 2 milliamps this gives an uncertainty of only .1 p.p.m. per switch. In practice, these potential variations are small and are only important if the variations occur between readings made at the conditions of normal excitation and reversed excitation. The condition of reversed excitation is achieved simply by reversing the excitation 27.

Excitation 27 may be AC or DC. If DC is used the current through unknown resistor R will reverse at each switching and an AC detector is required. This has the advantage of ignoring thermoelectric potentials associated with resistor R but reactive effects of resistor R may introduce errors depending on the rate of cycling and magnitude of reactive values. Many variations are possible. For example, the bridge may be manually switched and an AC source used for excitation 27. Then the unknown resistor is subjected to AC and a balance is sought between the AC voltage levels appearing at the detector terminals at the two switch positions. However, in the preferred embodiment the excitation is phased to the bridge switches so that current flow from the source 27 is reversed with each switching of the bridge, DC current flows through the unknown resistor and the adjustable resistors and AC currents flow through the other bridge resistors. Consequently, a DC balance at the detector terminals is the means for comparing the unknown and known resistors while the AC balance is only indicative of the degree of balance of the other bridge components. This particular method is described in more detail in reference to FIGURES 3, 4, and 5. Similarly, if DC excitation is used and additional switching means is employed to reverse the polarity of the detector terminals with each switching of the bridge switches the comparison between resistor R and the known resistance appears as a DC signal while the AC signal is again indicative of the degree of balance of the other bridge resistors.

Figure 2:
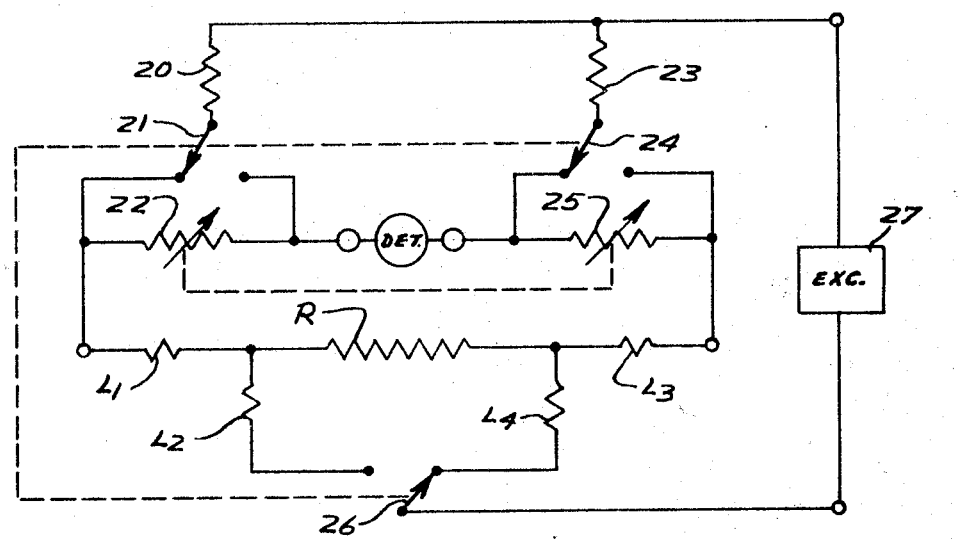
FIGURE 2 is a schematic showing basic operational features of the invention.

The errors resulting from imperfect switching in the known resistors 22 and 25 have not been eliminated in the circuit of FIGURE 2 and these errors can be expected to be of the same magnitude as for the prior art circuit of FIGURE 1, however, the preferred circuitry of FIGURE 3 reduces these errors also to negligibly small values.

Another limitation of the circuit of FIGURE 2, which is shared by the prior art circuitry of FIGURE 1, is that the known resistor(s) must be adjustable to the same value as the unknown resistor. Then in order to change the range of the bridge by each factor of ten, an additional decade of resistance comprising ten steps must be added to the bridge. This limitation is also overcome with the circuitry of FIGURE 3.

For high accuracy measurement applications the embodiment shown in schematic form in FIGURE 3 is preferred. This embodiment has two major improvements over the circuit of FIGURE 2; namely, the substitution of current dividing networks for the known resistors 22 and 25 of FIGURE 2, and the addition of a capacitor in series with a DC excitation source, the polarity of the DC source being switched in phase with the bridge switching.

At the first switch condition a first bridge branch comprises a portion of potentiometer 28 (the movable contact of which defines a first bridge excitation terminal) which connects through resistor 29 to the movable contact of divider 30. The ends of divider 30 are connected to the ends of known resistor 33 by means of reversing switch arms 31 and 32. One end of resistor 33 connects to a bridge signal detector terminal and the other end connects through lead $L_1$ to the junction of lead $L_1$ and lead $L_2$ which is the second bridge excitation terminal thus completing this branch circuit. The parallel branch circuit comprises the remaining portion of potentiometer 28 which connects through resistor 34 to the moving contact of divider 35. The ends of divider 35 connect across known resistor 38 by means of reversing switch arms 36 and 37. One end of resistor 38 connects to a detector terminal and the other end connects through lead $L_3$, thence through the unknown resistor R, to the second bridge excitation terminal thereby completing the bridge circuit. The excitation circuit comprises DC excitation source 39 connected at one end by reversing switch arm 40 thence through switch 42, to capacitor 43. The other end of capacitor 43 connects to the first bridge excitation terminal. The other end of excitation 39 connects through reversing switch arm 41 to switch 44 thence through lead $L_2$ to the second bridge excitation terminal.

At the second switch condition the ends of dividers 30 and 35 have been reversibly connected across resistors 33 and 38 respectively, switch 44 has switched the second bridge excitation terminal from the junction of leads $L_1$ and $L_2$ to the junction of leads $L_3$ and $L_4$ thereby switching the unknown resistor R from the second bridge branch circuit to the first bridge branch circuit and reversing switch arms 40 and 41 have reversed the polarity of source 39 thus reversing the current flow to the bridge. Switches 31, 32, 36, 37, 40, 41 and 44 are ganged together while switch 42 is adapted to be open only while the other switching is being done. Switch 42 then prevents undesirable current transients which could occur if the excitation circuit remained closed at the time of other switching functions.

Resistors 33 and 38, each designated Y, are the known resistors and are substantially equal. Dividers 30 and 35 each comprise a total resistance between ends designated 2K and a resistance between the movable contact and one end designated $K-X$. The remaining divider resistance is then $K+X$. The adjustable portion is from center to the right end of each divider. The movable contacts of dividers 30 and 35 are ganged together and the position of the movable contacts from center defined by the ratio $X/K$, is proportional to the unknown resistor R at bridge balance. These dividers are shown in simplified form in FIGURE 3 and a detailed and preferred form of divider comprising a combination of Kelvin-Varley and "put and take" resistor strings is described in reference to FIGURE 6. Although the bridge switching could be done manually it is preferable to accomplish the switching automatically at a rate of approximately 5 c.p.s. The preferred embodiment of FIGURE 3 employs a DC null detector to indicate bridge balance and the current to the bridge is reversed at each switching. As described above in reference to FIGURE 2 and because of the switch cycling, the comparison between unknown resistor R and the known resistors is made with unidirectional currents for this embodiment and unbalance of the other bridge resistors appears as an AC signal. Consequently it is important that no DC component be admitted to the bridge since this would result in an unwanted DC signal at the detector terminals dependent on resistors other than those being compared. No such DC components would exist if the "make" time of switch 42 was precisely the same for each condition of bridge and excitation switching but this requirement is difficult to meet. The addition of capacitor 43 in series with the excitation and bridge insures that no DC component is admitted to the bridge and averages the alternating currents so that an averaging type null detector such as a conventional DC galvanometer of the moving coil type effectively responds only to an unbalance between the unknown and known resistors. The preferred value for capacitor 43 depends somewhat on frequency of switching and bridge resistance and a value of 20 microfarads has been found satisfactory for a switching rate of 5 c.p.s. and bridge resistance of 5000–10,000 ohms.

FIGURES 4 and 5 have been prepared to more clearly show the operation of the circuit of FIGURE 3. FIGURE 4 shows relative positioning of the various bridge resistors and excitation when the switches are at the position shown in FIGURE 3. FIGURE 5 similarly shows the bridge configuration when the other bridge switch condition is made. The parallel combinations of the dividers and known resistors have been transformed by the analytical delta to Y transformation giving effective resistances which simplifies comparison of the bridges resulting from the two switch conditions. The bridges of FIGURES 4 and 5 are designated A and B respectively. Bridge A comprises a first branch having a portion of resistor 28 in series with resistor 29 and the effective resistance $$\frac{(K+X)(K-x)}{2K+Y}$$

in an upper arm; and an effective resistance $$\frac{Y(K+X)}{2K+Y}$$

in series with lead $L_1$ in a lower bridge arm. The parallel branch comprises the remaining portion of resistor 28 in series with resistor 34 and effective resistance $$\frac{(K+X)(K-X)}{2K+Y}$$

in an upper arm; and effective resistance $$\frac{Y(K-X)}{2K+Y}$$

in series with lead $L_3$ and unknown resistor R in a lower arm. The detector circuit comprises effective resistance $$\frac{Y(K-X)}{2K+Y}$$

connected to the first branch and effective resistance $$\frac{Y(K+X)}{2K+Y}$$

connected to the parallel branch. The excitation circuit comprises excitation 39 connected to deliver current through capacitor 43 to the upper bridge arms and connected through lead $L_2$ to the lower bridge arms. Bridge B shows no change in upper arm resistors from Bridge A. The detector circuit of Bridge B shows that the effective resistances of Bridge A have only been interchange and the excitation circuit shows that the excitation 39 now delivers current through lead $L_4$ to the lower bridge arms with the current return path being from the bridge upper arms through capacitor 43. Lead $L_1$ is still in the first branch and lead $L_3$ remains in the parallel branch, however, resistor R now appears in the first branch and the effective resistances in the lower bridge arms have beeen interchanged. Then if the average currents delivered to the two bridges are equal in magnitude but opposite in sign, the unidirectional currents in the detector circuit will be zero when $$\frac{Y(K+X)}{2K+Y} = \frac{Y(K-X)}{2K+Y} + R$$

giving $$R = \frac{2XY}{2K+Y}$$

which may be rewritten as $$R = \left(\frac{2KY}{2K+Y}\right)\left(\frac{X}{K}\right)$$

Consequently the unknown resistor R is directly proportional to $X/K$, which is the fractional setting of the dividers, and to $$\frac{2KY}{2K+Y}$$

which is the resistance of each divider network, when the DC detector currents are zero under cyclic operation of the bridge. Then it is apparent that the range of resistance R that may be measured with the bridge may be changed up to a maximum value of 2K simply by changing Y in appropriate steps. The value 2K is achieved when Y is open circuited or approaches an infinite value.

Note that if lead $L_1$ is not the same as lead $L_3$ this will give rise to a detector current of one polarity in Bridge A and the opposite polarity in Bridge B so that such differences appear only as alternating currents in the detector circuit. Similarly an unbalance of the resistors in the upper arms of the bridge will result only in alternating currents in the detector circuit. With respect to differences between lead $L_2$ and lead $L_4$ it would seem that such a difference would result in difference currents to the two bridges, however, since capacitor 43 is in series with the bridges it serves to precisely equalize these currents. It is, of course, necessary that the time constant of capacitor 43 be long enough so it doesn't become fully charged at each bridge condition. If lead unbalance or unbalance in the upper arm resistors 29 and 34 is so large that it is difficult to determine a DC null in the presence of the AC signal, potentiometer 28 may be adjusted to reduce the AC components. It would also be possible to effect this adjustment by means of adjustable resistors (not shown) in series with leads $L_1$ and $L_3$.

The dividers 30 and 35 of FIGURE 3 have been shown in simplified form and a preferred design for these dividers is shown in FIGURE 6 which is a detailed schematic of a divider network to be used in place of the network comprising divider 30 and resistor 33 of FIGURE 3. The same circuit is also used in place of divider 35 and resistor 38 of FIGURE 3. The network of FIGURE 6 is substituted into the bridge by connecting terminal 45 to resistor 29, terminal 55 connects to the detector circuit and terminal 54 connects to lead $L_1$. Switches 48 and 49 are identical to switches 31 and 32 of FIGURE 3. The divider network of FIGURE 6 comprises seven sets of resistors, each set being stepwise adjustable through moving arms which are coupled to representative indicating dials. The seven sets are designated as $D_1$, through $D_7$ where $D_7$ is the range dial and $D_1$ through $D_6$ are eleven position resistor strings giving numbers zero through ten for each of six decades of adjustment. The sets designated $D_3$, $D_4$, $D_5$, $D_6$ are "put and take" type resistor strings. This type of adjustable resistor introduces smaller switching transients than the Kelvin-Varley sets because there is no possibility of "shorting" of a step. However, the put and take does require more resistors (except for the end set $D_3$) than a Kelvin-Varley so it is used in the lower four decades only where individual resistor tolerance is greater than in the higher decades. Minimization of transients in these lower decades is most important since these decades are adjusted more frequently than the higher value decades $D_1$ and $D_2$. As shown, the moving contact of $D_3$ connects to terminal 45. The resistor string of $D_3$ simply comprises ten equal resistors with contacts at each end and between each resistor. For a particular design described herein each resistor of this string was 100 ohms. Set $D_4$ is connected to the ends of the resistor string of $D_3$ and comprises two ganged resistor strings of ten equal steps wherein 10 ohms is "put" into one string and "taken" out of the other string with each step. A similar set $D_5$ shown in block form is connected to the ends of $D_4$ and comprises steps of 1 ohm each. A similar set $D_6$ also shown in block form is connected to the ends of $D_5$ and comprises steps of 0.1 ohm each. The ends of $D_6$ are connected to the moving contacts of Kelvin-Varley set $D_2$ which comprises ten equal steps of 444.5 ohms each. The ends of this resistor string are connected to the moving contacts of another Kelvin-Varley set $D_1$ which comprises ten equal steps of 500 ohms each. Resistor 46 is connected across the moving contacts of $D_1$ and is 1673.525 ohms. The movable contacts for $D_1$ through $D_6$ are all shown at their zero positions. Resistor 47, which is a K resistor for the circuit of FIGURE 3, is in series with the resistor string of $D_1$ and connects to the moving arm of switch 48. Resistor 47 is 5555.55 ohms for this design. The other end of string $D_1$ connects to the moving arm of switch 49. Resistors 50, 51, 52, and 53 are individually and separably connectable across the series combination of resistor 47 and $D_1$, by means of moving contacts of $D_7$ and switches 48 and 49. Range resistor 50 through 53 are 1,234,566 ohms, 112.2333 ohms, 11.12222 ohms and 1.111221 ohms respectively for this design. An additional range is obtained by connecting the moving contacts of $D_7$ to the contacts at the bottom of the drawing which is equivalent to connecting an infinite resistor across the divider network. Then for the specific values of resistors given about $D_7$ provides ranging from 1 ohm to 10,000 ohms in five decades and dividers $D_1$ through $D_6$ provide decimal subdivisions to 1 p.p.m. for each range.

Figure 7:
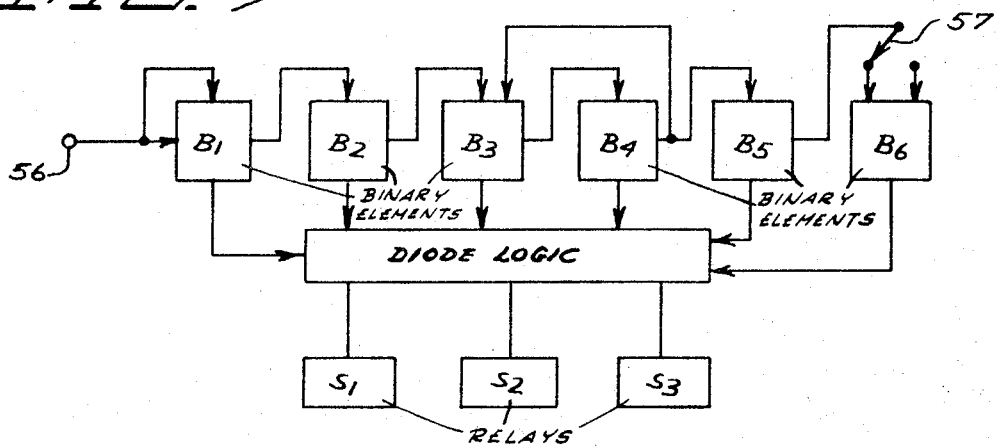
FIGURE 7 is a schematic of the switching logic used with the apparatus of FIGURES 3 and 6.

Ranging resistors 50 through 53 are four-terminal type resistors so that lead effects are minimized. Two of the leads are then in series with the high resistance of the divider and hence contribute a reistance which is negligibly small. Another lead appears in series with the detector circuit and its resistance can be ignored and the remaining lead is in series with lead $L_1$ of the unknown resistor thereby contributing only to the AC component which is unimportant as described in reference to lead $L_1$ above. For this example, capacitor 43 (FIGURE 3) can be 20 microfarads, resistors 29 and 34 can be 5000 ohms each and resistor 28 can be 50 ohms. A satisfactory relay switch which can be used for each of the required switches is Model HG52MT–5002 made by C. P. Clare and Co., Chicago, Ill. of FIGURE 3 is demonstrated in block form in FIGURE 7. Relays are designated $S_1$, $S_2$ and $S_3$ where $S_1$ operates excitation series switch 42, $S_2$ operates the excitation reversing switches 40 and 41, and $S_3$ operates bridge switches 31, 32, 36, 37, and 44. These relays are driven through conventional diode logic circuitry such as that described in the book "Pulse and Digital Circuits" by Millman and Taub, McGraw-Hill, 1956, and are energized by a series of binary elements designated $B_1$ through $B_6$. The binary elements are driven by a 120 c.p.s. signal derived from rectification of line frequency and delivered to terminal 56. Binary $B_6$ is controlled manually by reversing switch 57 and acts to invert the phasing between $S_2$ and $S_3$. Switch 57 then is comparable to the excitation reversing switch commonly employed in DC bridge designs to cancel the effect of thermal EMF's. Excitation source 39 could be manually reversed to make this check or switch 42 could be held open. However, such techniques could result in undesirable transients to the detector circuit if the switching was done when currents were being delivered to the bridge. Binary $B_6$ accomplishes this reversal only when $S_1$ has opened switch 42 so such transients are avoided. Binary designated $B_1$ through $B_5$ are series connected with a feedback path existing from the output of $B_4$ to the input of $B_3$. Thus, twenty-four pulses are required to complete a full cycle of operation giving a frequency of 5 c.p.s. The diode logic circuitry is connected in known manner so that relay $S_1$ closes switch 42 for $\frac{1}{15}$ sec. ($\frac{1}{3}$ cycle) and opens the switch for $\frac{1}{30}$ sec. ($\frac{1}{6}$ cycle). Relays $S_2$ and $S_3$ operate midway through the "off" time of $\frac{1}{30}$ sec. of relay $S_1$ and reverse every $\frac{1}{10}$ sec. ($\frac{1}{2}$ cycle). Thus the bridge is energized at a duty cycle of $\frac{2}{3}$ and all bridge switching and excitation reversal is done at time of zero current flow to the bridge.

Figure 8:
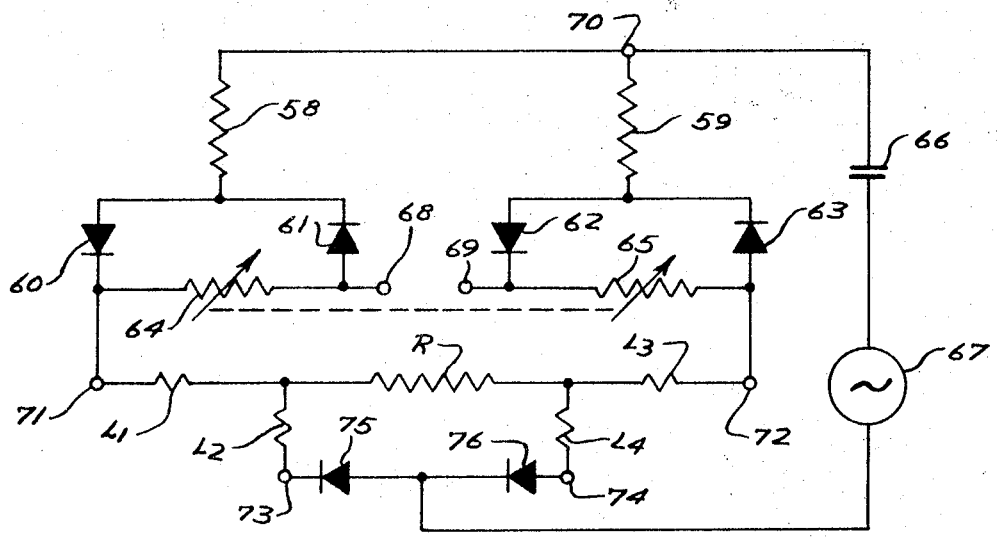
FIGURE 8 is a schematic showing non-mechanical type switching means which can be employed in certain embodiments of the invention.
Figure 9:
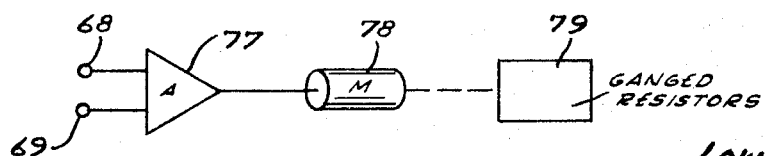
FIGURE 9 is a schematic showing automatic balancing apparatus for the circuitry of FIGURE 3 and FIGURE 8.

A further embodiment of the bridge circuitry presented herein is shown in FIGURE 8. This embodiment demonstrates the use of non-mechanical type switching means and is useful, for example, in applications where precision requirements are relaxed and size and weight is critical. While the aforementioned bridge designs are especially suitable as laboratory standard type instruments the circuitry of FIGURE 8 is suitable for application in non-laboratory type environments. The bridge of FIGURE 8 resembles the schematic of FIGURE 2. The major change from FIGURE 2 is that the bridge switches have been replaced with a pair of diodes in each instance, the anode of one diode being connected to the cathode of the other diode. A first portion of the bridge comprises resistor 58 connected at one end to excitation terminal 70 and at the other end to the anode of diode 60 and to the cathode of diode 61. The cathode of diode 60 connects to one end of the known resistor 64 and to terminal 71. The anode of diode 61 connects to the other end of resistor 64 and to detector terminal 68. A complementary portion of the bridge comprises resistor 59 connected at one end to excitation terminal 70 and at the other end to the anode of diode 62 and cathode of diode 63. The cathode of diode 62 connects to detector terminal 69 and to one end of known resistor 65. The anode of diode 63 connects to the other end of resistor 64 and to terminal 72. The excitation circuit comprises blocking capacitor 66 connected in series with bridge terminal 70 and one side of AC excitation 67. The other side of excitation 67 connects to the anode of diode 76 and to the cathode of diode 75. The anode of diode 75 connects to terminal 73 and the cathode of diode 76 connects to terminal 74. The bridge circuit is completed by connecting an unknown resistor R to terminals 71, 73 by means of leads $L_1$, $L_2$ respectively and to terminals 72, 74 by means of leads $L_3$, $L_4$ respectively. When a positive current is delivered to bridge terminal 70 a first branch current flows through resistor 58, diode 60, lead $L_1$, and to the junction of leads $L_3$, $L_4$. The parallel branch current flows through resistor 59, diode 62, resistor 65, and lead $L_3$ to the junction of leads $L_3$, $L_4$. On the alternate half cycle positive current is delivered through diode 75 to the junction of leads $L_1$, $L_2$ and the first branch current flow is through lead $L_1$, resistor 64, diode 61, and resistor 58 to terminal 70. The parallel branch current flows through resistor R, lead $L_3$, diode 63 and resistor 59 to terminal 70. The current flow through resistor R, resistor 64, and resistor 65 is unidirectional and the current flow through the other branch resistors is alternating. On one half cycle resistor R is compared to resistor 65 and in the next half cycle resistor R is compared to resistor 64 the comparison being made with unidirectional currents. Consequently, if resistors 64 and 65 are equal, a DC balance at terminals 68 and 69 shows that resistor R is also equal to resistors 64 and 65 and a DC potential at these terminals is indicative of the value of resistance R. Resistors 64 and 65 are preferably adjustable and ganged together so that the bridge may be used in a balanced condition. Such balancing may be done manually or can be done automatically as shown in schematic form in FIGURE 9 where servo amplifier 77 is shown connected to a motor which in turn is mechanically coupled to block 79. Block 79 in this instance represents the control of ganged resistors 64, 65 of FIGURE 8. Amplifier 77 is controlled by the DC signal present at terminal 68, 69 which are the detector terminals of FIGURE 8.

It is apparent that electrical devices other than the simple diodes shown in FIGURE 8 could be used in place of those diodes. It is also apparent that similar rectifying diodes could be employed for example in the circuit of FIGURE 3 without departing from the scope of this disclosure or that the circuitry of FIGURE 9 may be used with the circuitry of FIGURE 3 in order to affect automatic balancing.

Although in each instance a simple power supply has been described to provide currents to the two branch circuits it is apparent that a separate power supply could be provided for each branch. For example, in the circuit of FIGURE 8 a direct connection could be made between terminal 70 and the junction of diodes 75 and 76 if resistors 58 and 59 were each replaced with a transformer winding of like polarity.

What is claimed is:

1. Resistor comparison circuitry comprising: first and second parallel branch circuits each having resistance means forming two separate arms, a first resistor, first switching means to alternately connect the first resistor into a first arm of the first branch circuit and into an adjacent arm of the second branch circuit; second and third substantially identical resistance means each adapted for fixed connection to opposite ends respectively of the first resistor, second switching means to connect said second resistance means into the first arm of the first branch circuit and effectively remove the third resistance means from both branch circuits, and alternately to connect the third resistance means into the adjacent arm and remove the second resistance means from both of the said branch circuits, first connecting means for energizing the branch circuits, second connecting means connected across the first arm and the adjacent arm for connecting to signal detection circuitry, and means for dependently adjusting said second and third resistors simultaneously.

2. The circuit of claim 1 wherein direct current excitation means is connected to the first connecting means and alternating current detection means is connected to the second connecting means, whereby a detection signal balance is indicative of equality between the first resistor and the second and third resistance means.

3. The circuit of claim 1 and excitation means connected to the first connecting means to provide excitation current flow through the branch circuits and wherein means are provided to alternately reverse the excitation current flow through the first and second branch circuits in synchronism with connection of the first resistor in the first arm and in the adjacent arm and direct current detection means are connected to the second connecting means whereby a detection signal balance is indicative of equality between the first resistor and the second and third resistance means.

4. The circuit of claim 1 and a pair of adjustable potentiometers and wherein the second and third resistance means each comprises a known resistor connected in parallel with one of the adjustable potentiometers.

5. The circuit of claim 3 wherein the excitation means is in parallel with the first and second branch circuits and a capacitor connected in series with the excitation means and the first and second branch circuits.

6. Resistor comparison circuitry comprising: a pair of current dividers each having an adjustable contact and ends; a pair of separate known resistors, each having first and second ends; a pair of double pole-double throw switches each reversibly connecting the ends of one of the current dividers across one of the separate known resistors; means to fixedly connect an unknown resistor between the first ends of the known resistors; means to connect a detector between the second ends of the known resistors; first and second excitation terminals adapted for connection across an excitation means; a single pole-double throw switch for selectively connecting the first excitation terminal to the ends of the unknown resistor; and means to connect the adjustable contacts to the second excitation terminal.

7. The circuit of claim 6, a direct current excitation source, and a double pole-double throw excitation reversing switch; and wherein said second terminal connects to an arm of said double pole-double throw excitation reversing switch; the arm of the single pole-double throw switch being connected to the other arm of the double pole-double throw excitation reversing switch; said excitation reversing switch further being connected to said direct current source so that the current flow reverses to the excitation terminals when the switch is in its alternate arm position; and a capacitor connected in series with one of the excitation reversing switch arms.

8. The circuit of claim 7 wherein means are provided to synchronously cycle all of the switches from one arm position to the other so that the unknown resistor is compared to one of the known resistors at one arm position and is compared to the other known resistor at the other arm position and current flows through the unknown resistor in the same direction at each arm position; and means are provided to knowingly adjust the adjustable contacts in ganged relation so that a direct current detector balance may be achieved to indicate the value of the unknown resistor.

9. The circuit of claim 8 wherein additional switch means movable between open and closed positions is provided in series with one arm of the excitation reversing switch and is adapted to be open when the other switch arms are changing positions.

10. The circuit of claim 9 wherein each divider comprises a plurality of sets of resistors, each set giving at least a full decade of adjustment.

11. A method of measuring a resistance comprising the steps of:
connecting an unknown resistance between first and second adjustable, identical known resistances;
providing a first excitation current wherein a reference portion of the current flows through a first one of the known resistances and a separate portion flows through the unknown resistance with the second known resistance effectively out of the circuit;
monitoring a first voltage across the first known and the first unknown resistances;
removing the first excitation current and effectively removing the first unknown resistance from the circuits;
providing a second excitation current wherein a reference portion of the current flows through the second known resistance and a separate portion flows through the unknown resistance;
monitoring a second voltage across the second known and the second unknown resistances;
adjusting the known resistance and repeating the previous steps until a balance is achieved between the first and second voltages.

12. Resistance comparison circuitry comprising: first and second parallel branch circuits each having resistance means forming two arms; a first resistance means, first switching means to first connect said first resistance means to form a portion of the resistance means comprising a first arm of the first branch circuit and alternately connecting said first resistance means to form at least a portion of the resistance means comprising an adjacent arm of the second branch circuit, a second resistance means, switching means to connect said second resistance means to form at least a part of the resistance means comprising said first arm only when said first resistance means is connected in the adjacent arm and alternately to effectively remove the second resistance means from both branch circuits, a third resistance means, third switching means to connect the third resistance means to form at least a portion of the resistance means is in the first arm, and alternately to effectively remove the third resistance means from both branch circuits, first connecting means for energizing the branch circuits, and second connecting means connected across the first arm and the adjacent arm for connecting to signal detection circuitry.

13. Resistor comparison circuitry comprising: a pair of current dividers each having an adjustable contact and ends; a pair of excitation terminals, a pair of detector terminals, a pair of terminals for connecting an unknown resistor, separate switch means each reversibly connecting the ends of one of the current dividers to a separate detector terminal and a separate unknown resistor terminal respectively; switch means alternately connecting a first excitation terminal to the unknown resistor terminals; and means to connect the adjustable contacts to a second excitation terminal.

14. A comparison apparatus comprising first and second branch circuits each having impedances forming first and second arms; means for energizing the branch circuits to cause an excitation current flow therein; signal detection means across the branch circuits connected between the impedances forming the first and second arms of each circuit; switching means to first connect a first impedance in a first arm of the first branch circuit and a second impedance in an adjacent arm of the second branch circuit, and alternately to connect the first impedance in the adjacent arm of the second branch circuit, and connect a third impedance in the first arm of the first branch circuit, said second and third impedances otherwise being effectively removed from said first and second branch circuits by the respective switch means.

15. The combination as specified in claim 14 and means for adjusting the second and third impedances to change their respective values in a known relation.

16. The combination as specified in claim 14 wherein said first and second branch circuits are connected in parallel, and said second and third impedances are substantially equal in value and are adjustable simultaneously.

17. The apparatus as specified in claim 14 wherein the switching means comprise diodes connected in circuit and wherein said excitation current periodically changes in direction of flow.

18. Resistance comparison circuitry comprising a pair of current dividers each having an adjustable contact and ends, a pair of separate known resistors each having first and second ends, switching means to reversibly connect the ends of each of the current dividers across a separate one of the separate known resistors, means to connect an unknown resistor between the first ends of the known resistors, means to connect a detector between the second ends of the known resistors, first and second excitation terminals adapted for connection across an excitation means, and switching means for selectively connecting the first excitation terminal to the opposite ends of the unknown resistor and means to connect the adjustable contacts to the second excitation terminals, said excitation terminals being adapted for connection to an excitation source.

References Cited

UNITED STATES PATENTS

| | | | |
|---|---|---|---|
| 1,997,164 | 4/1935 | Zuschlag | 324—62 |
| 2,943,480 | 7/1960 | Nelting | 324—62 |

FOREIGN PATENTS 877,642  5/1953  Germany.

EDWARD E. KUBASIEWICZ, Primary Examiner

U.S. Cl. X.R.

323—75